United States Patent [19]

Ishikawa

[11] Patent Number: 4,979,709
[45] Date of Patent: Dec. 25, 1990

[54] TRIPOD HEAD

[75] Inventor: Masao Ishikawa, Yashio, Japan

[73] Assignee: Heiwa Seiki Kogyo Co., Ltd., Saitama, Japan

[21] Appl. No.: 354,556

[22] Filed: May 22, 1989

[30] Foreign Application Priority Data

Feb. 28, 1989 [JP] Japan ............................... 1-22473[U]

[51] Int. Cl.$^5$ ............................................ F16M 13/00
[52] U.S. Cl. ...................................... 248/187; 248/298
[58] Field of Search ...................... 248/187, 183, 297.2, 248/298; 354/293

[56] References Cited

U.S. PATENT DOCUMENTS

| | | | |
|---|---|---|---|
| 2,840,334 | 6/1958 | Cauthen | 248/187 |
| 3,612,462 | 10/1971 | Mooney | 248/187 X |
| 3,955,788 | 5/1976 | Delage | 248/298 X |
| 4,057,816 | 11/1977 | Killian, Jr. et al. | 248/187 X |
| 4,316,592 | 2/1982 | Jett | 248/187 |
| 4,466,595 | 8/1984 | O'Connor | 248/187 X |
| 4,525,052 | 6/1985 | Kasugi et al. | 248/187 X |

OTHER PUBLICATIONS

Catalog Sheet for VSF-2000S Tripod.
Catalog Sheet for VSF-3000E Tripod.

*Primary Examiner*—Carl D. Friedman
*Assistant Examiner*—Daniel Hulseberg
*Attorney, Agent, or Firm*—Armstrong, Nikaido, Marmelstein, Kubovcik, & Murray

[57] ABSTRACT

A movable plate means is provided on the top of the tripod head for a camera or the like of the present invention. The movable plate means comprises a plate supporting board, a movable plate and a pressure locking mechanism, and the movable plate is releasably, fixably and slidably engaged in a central groove portion formed at the plate supporting board. Pin grooves comprising shorter and longer grooves not going through are formed reverse-symmetrically at the movable plate. The shorter groove has a taper at the end thereof, which facilitates engagement of the movable plate. A stop pin is releasably provided in the longer groove. When it is inserted, it forms a sliding limit in forward and backward directions of the movable plate and prevents the movable plate from coming off the plate supporting board. When the pin is removed, the movable plate can be easily removed from the plate supported board. The stop pin is connected to the stop pin push button via an elastic body, so that pressing the stop pin push button removes the stop pin from the longer groove, and non-pressing it keeps the stop pin in the state inserted in the longer groove. According to the tripod head of the present invention, it is possible to stably support a camera or the like in an appropriate balance even with different weight and center gravity of the camera or the like.

3 Claims, 4 Drawing Sheets

TRIPOD HEAD

FIELD OF THE INVENTION

The present invention relates to a tripod head. More particularly, the present invention relates to a tripod head provided with a movable plate capable of properly balancing irrespective of differences in weight or center of gravity of the camera or the like to be mounted thereon.

DESCRIPTION OF PRIOR ART

For a tripod head for securing a camera or the like, it is the conventional practice to provide the tripod head with a securing plate on the top thereof so that the camera or the like may be firmly secured to this plate during horizontal rotation and/or vertical tilting of the tripod head.

However, the conventional tripod head as described above is not necessarily satisfactory for balancing in response to the change in weight or center of gravity of the camera or the like to be mounted thereon, the weight and the center of gravity varying between types of camera or the like.

Although the above-mentioned balancing may be coped with by the improvement of the vertical tilting mechanism of the tripod head, it is difficult to keep balance in the normal state at a standstill. It is therefore essential to make some improvement in the top plate portion for securing and supporting the camera or the like.

Actually, however, this problem has not as yet been sufficiently considered in the conventional tripod heads.

OBJECT OF THE INVENTION

An object the present invention is therefore to provide an improved tripod head for a camera or the like, which facilitates a balanced attachment of the camera or the like, irrespective of differences in the weight and center of gravity of the camera or the like to be mounted thereon, by solving the above-mentioned defect of the conventional tripod head for a camera or the like.

The aforementioned object of the present invention and other objects thereof will be understood more clearly by the following detailed description made with reference to the attached drawings illustrating an embodiment of the present invention.

DETAILED DESCRIPTION OF THE EMBODIMENTS

Figure 1:
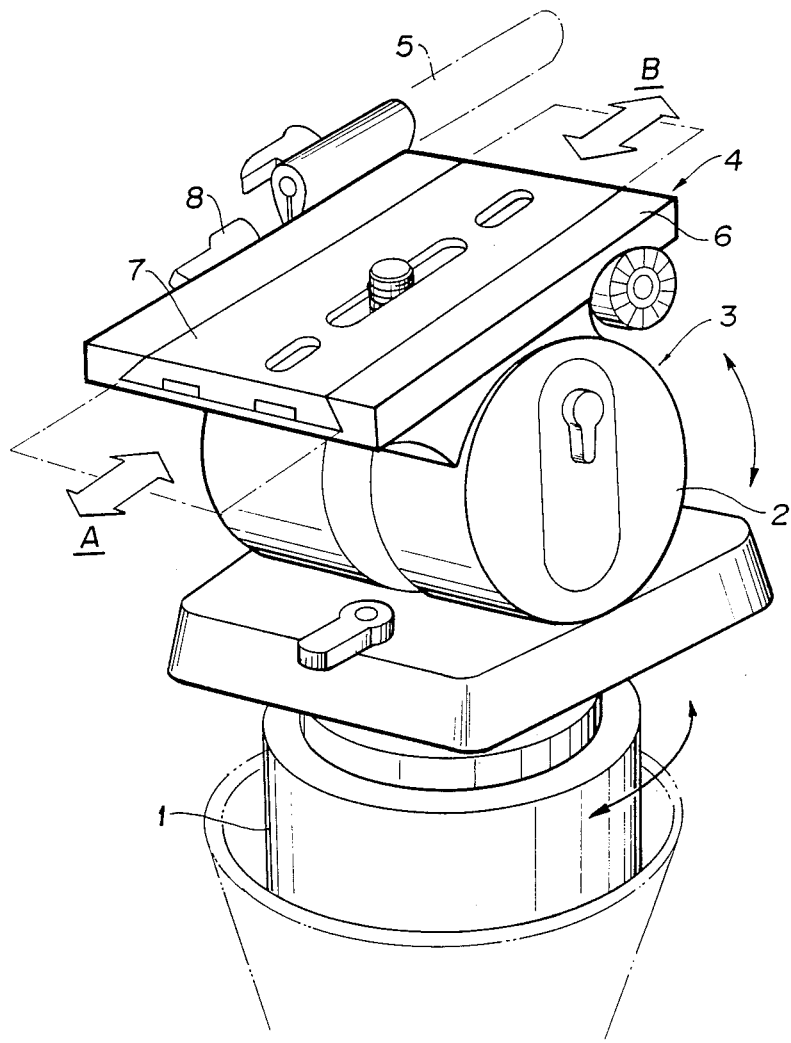
FIG. 1 is a perspective view illustrating the whole view of an embodiment of the tripod head of the present invention.

FIG. 1 is a perspective whole view illustrating an outline of the structure of the tripod head of the present invention.

For example, the movable plate means (4) of the present invention is fitted on the top of a tripod head (3) having a horizontal rotating means (1) and a vertical tilting means (2) as shown in FIG. 1. This tripod head (3) can horizontally rotate and vertically tilt a camera or the like secured to this movable plate means (4) by operating a knob (5).

In the tripod head (3) of the present invention, the movable plate means (4) comprises a plate supporting board (6) and a movable plate (7), this movable plate (7) being slidable forward (A) or backward (B) as shown in FIG. 1. The movable plate (7) may be fixed by operating a built-in pressure locking mechanism by acting on a locking knob (8) or made slidable by releasing it.

Figure 2:
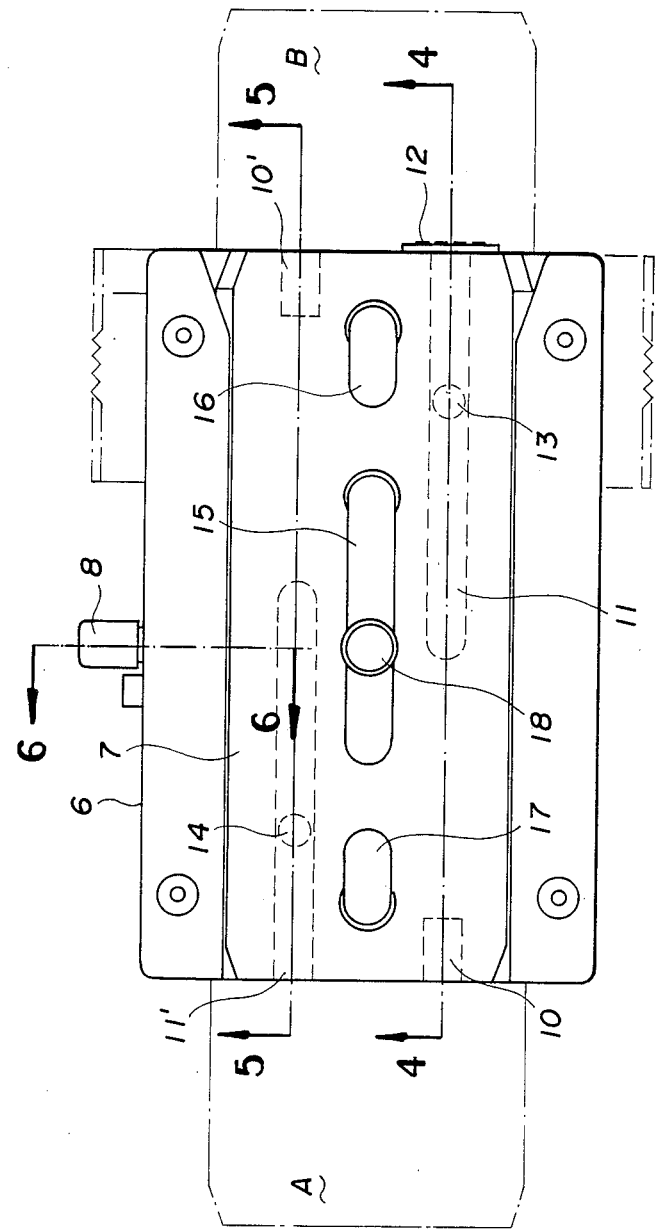
FIGS. 2 and 3 are a plan view and a right side view illustrating an embodiment of the movable plate means of the present invention.

FIG. 2 and the subsequent drawings illustrate in more detail the above-mentioned movable plate means (4) of the tripod head of the present invention.

Figure 3:
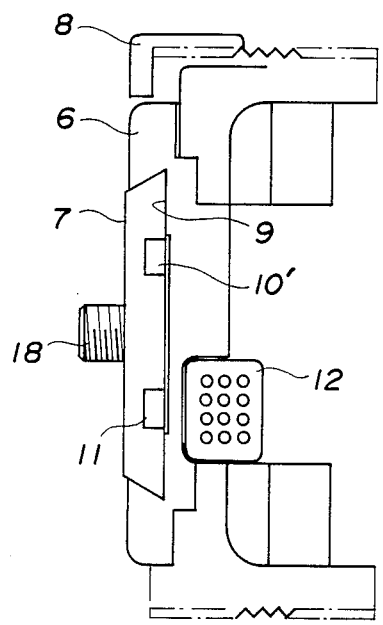

FIG. 2 is a plan view illustrating the movable plate means; and FIG. 3, a right side view thereof.

As shown in FIGS. 2 and 3, for example, the movable plate means (4) used in the tripod head of the present invention comprises a plate supporting board (6) having a locking button (8) for the pressure locking mechanism on the side thereof, and a movable plate (7), so that this movable plate (7) is releasably, fixably and slidably engaged in a center groove (8) on the plate supporting board (6).

The movable plate (7) is provided with pin grooves reverse-symmetrically formed as shorter grooves (10) and (10') and longer grooves (11) and (11') not going through forward or backward, and a stop pin push button (12) is arranged on the trailing end portion of the plate supporting board (6). Furthermore, a stop pin (13) engageable and disengageable with the longer groove (11) as a pin groove is provided near the stop pin push button (12). A front stopper (14) is inserted into the longer groove (11') reverse-symmetrical thereto, and is secured to the groove portion (9) of the plate supporting board (6).

As described above, the movable plate (7) is slidable forward (A) and backward (B). Holes (15), (16) and (17) and a pin (18) are shown as examples of parts for fixing the camera or the like.

Figure 4:
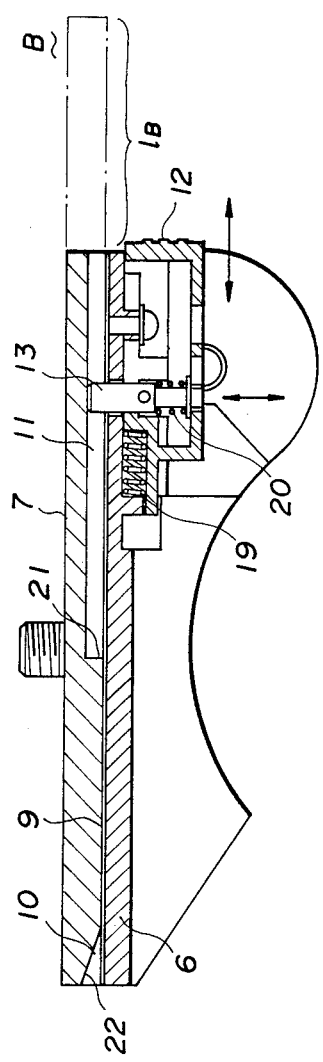

FIG. 4 is a sectional view of FIG. 2 cut along the line V—V. In this embodiment, as shown in FIG. 4, it is made possible to push and cause repulsion of, the stop pin push button (12) forward and backward by means of an elastic body (19) such as a coil spring, so that, upon pressing, the stop pin (13) sinks down under the effect of the elastic body (20), and the movable plate (7) can be disengaged from the plate supporting board (6) without the inner end (21) of the longer groove coming in touch with the stop pin (13).

When the stop pin push button (12) is not pressed, the movable plate (7) is slidable within a certain range, since the stop pin (13) is inserted in the longer groove (11). This makes the movable plate (7) slidable and permits prevention of the plate supporting board (6) from coming off. More specifically, this makes it slidable backward (B) in response to the length of the longer groove (11), and prevents it from coming off backward under the effect of contact with the inner end (21) of and the stop pin (13). When completely removing the movable plate (7), it suffices to press the stop pin push button (12) to cause the stop pin (13) to sink down.

A taper (22) at the end portion is formed in the shorter groove (10) of the movable plate (7). When engaging the movable plate (7) from back (B) of the plate supporting board (6) by means of this taper (22), the stop pin (13) can be automatically pressed down, and it is thus possible to easily insert the movable plate (7) into the groove portion (9) of the plate supporting board (6) irrespective of the operation of the stop pin push button (12).

Figure 5:
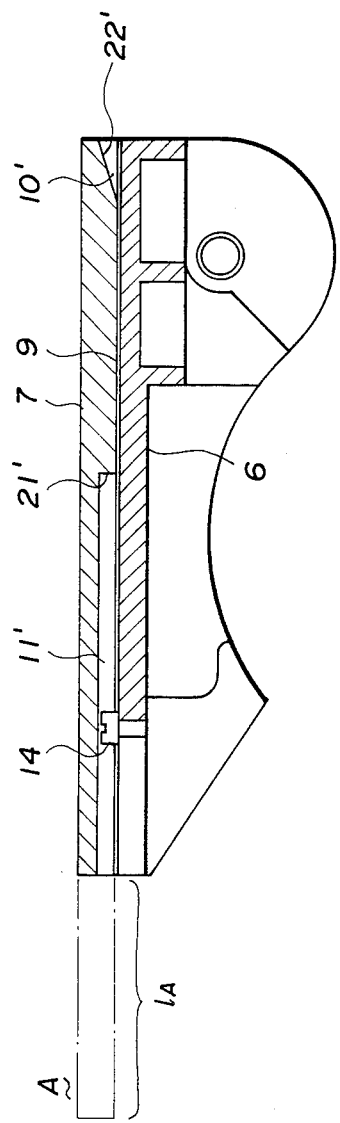

As shown in FIG. 5, the movable plate (7) is also slidable forward (A) in response to the length of the longer groove (11'). FIG. 5 is a sectional view of FIG. 2 cut along the line IV—IV.

The movable plate (7) is prevented from coming off forward (A), as shown in FIG. 5 by the contact of the front stopper (14) inserted into the longer groove (11') with the inner end (21') of the longer groove (11').

A taper (22') is also formed in the shorter groove (10') as in FIG. 4. More particularly, as is clear from this, it is possible to insert the movable plate (7) into the groove portion (9) of the plate supporting board (6) from back (B) of the tripod head irrespective of whether forward or backward, by forming longer grooves (11) and (11') and shorter grooves (10) and (10') perfectly reverse-symmetrically at the movable plate (7).

By the use of the structure as described above, the movable plate (7) can slide forward (A) and backward (B) by equivalent distances ($l_A$) and ($l_B$), respectively; spontaneous coming-off being completely prevented, and insertion and removal thereof becoming very easy.

After securing the movable plate (7) to the plate supporting board (6) by moving the movable plate (7) forward (A) or backward (B) by an appropriate distance in response to the difference in weight and center of gravity of a camera or other optical, electrical, communications, instrumental or measuring device to be mounted on the tripod head, the camera or the like can be fitted to the movable plate (7). Since the device can be easily secured and there is no risk of it coming off after securing, the movable plate is very effective for securing a camera or the like by balancing the top plate of the tripod head for a camera or the like.

Figure 6:
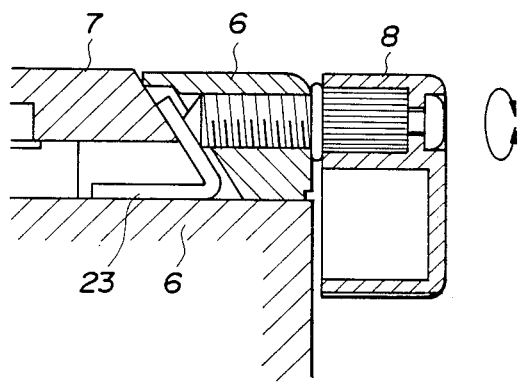
FIGS. 4, 5, and 6 are sectional views of the embodiment of FIGS. 2 and 3.

The movable plate (7) can be secured to the plate supporting board (6) by means of a pressure locking mechanism as shown in FIG. 6 (a sectional view of FIG. 2 cut along the line VI—VI. This pressure locking mechanism is designed to firmly secure the movable plate (7) by arranging a pressing plate (23) between the plate supporting board (6) and the movable plate (7) and pressing this pressing plate (23) by turning the locking knob (8).

It is needless to mention that above description has presented only an embodiment of the present invention, and the present invention is not limited to this embodiment. For example, many variations are possible in detail including not only the above-mentioned pressure locking mechanism, but also the shape and the size of the pin grooves and the operating mechanism of the stop pin.

What is claimed is:

1. A tripod head having a movable head that comprises:

a top plate for securing a camera having first and second ends, and tapered side surfaces;

a plate supporting board having first and second board ends for supporting said top plate, said top plate being slidably engaged with said plate supporting board and slidably insertable into said plate supporting board from the first or second board ends;

a pressure locking mechanism located on a side of said plate supporting board for securing said top plate;

a pair of first grooves defined on a bottom of said top plate parallel to a longitudinal centerline between said first and second ends of said top plate, one of said first grooves defined to open into said first end of said top plate and a second of said first grooves defined to open into said second end of said top plate wherein said first grooves are located substantially diagonally opposite one another;

a pair of tapered second grooves defined on a bottom of said top plate parallel to the longitudinal centerline of said top plate, one of said second grooves defined to open and taper out into said first end of said top plate and a second of said second grooves defined to open and taper out into said second end of said top plate, wherein said second grooves are located substantially diagonally opposite one another and each of said second grooves is directly opposite each of said first grooves further said second grooves being substantially shorter than said first grooves;

a stop pin located on an upper surface of said plate supporting board such that said stop pin is vertically movably engaged with one of said first grooves, said stop pin being disengaged by one of said tapered second grooves when said top plate is initially inserted into said plate supporting board; and means for disengaging said stop pin from the one of said first grooves so as to disengage said top plate from said plate supporting board.

2. A tripod head as set forth in claim 1, wherein said pressure locking mechanism further comprises:

a pressing plate for engaging the tapered side surface of said top plate; and a locking pin for securing said pressing plate to the tapered side surface of said top plate.

3. A tripod head as set forth in claim 1, wherein said plate supporting board further comprises:

a stopper located on an upper surface of said plate supporting board such that said stopper is movably engaged with a second of said first grooves for limiting movement of said top plate on said plate supporting board within an extent defined by said stop pin and said stopper engaged with said first grooves.

* * * * *